United States Patent [19]

Geller

[11] 3,869,549

[45] Mar. 4, 1975

[54] INJECTABLE OILY PEPTIDE PREPARATIONS AND PROCESSES FOR THEIR MANUFACTURE

[75] Inventor: Leo Geller, Basel, Switzerland

[73] Assignee: Ciba-Geigy Corporation, Ardsley, N.Y.

[22] Filed: Feb. 5, 1973

[21] Appl. No.: 329,519

[30] Foreign Application Priority Data
Feb. 17, 1972 Switzerland.......................... 2299/72
Dec. 7, 1972 Switzerland........................ 17829/72

[52] U.S. Cl. ............................................... 424/177
[51] Int. Cl. .......................................... C07c 103/52
[58] Field of Search .......... 260/112.5; 424/177, 179

[56] References Cited
UNITED STATES PATENTS

| 2,944,940 | 7/1960 | Fisher et al. | 424/177 |
| 2,945,783 | 7/1960 | Beekman et al. | 424/177 |

Primary Examiner—Elbert L. Roberts
Attorney, Agent, or Firm—Joseph G. Kolodny; John J. Maitner; Theodore O. Groeger

[57] ABSTRACT

The invention concerns injectable oily peptide preparations wherein the peptide or peptide salt is either adsorbed on a fatty acid salt of aluminium and the adsorbate is suspended in oil, or the peptide or peptide salt is suspended in a gel of a fatty acid salt of aluminium and an oil.

17 Claims, No Drawings

INJECTABLE OILY PEPTIDE PREPARATIONS AND PROCESSES FOR THEIR MANUFACTURE

In the therapeutic application of physiologically active peptides, for example of corticotropin, MSH, calcitonin, hypertensin, insulin, growth hormones, glucagon, thyrotropin, LHRH, TRH, vasopressin, bradykinin and others, and synthetic analogues of these peptides, a problem which has hitherto not yet been solved satisfactorily is that the peptides are too rapidly inactivated in the body. Attempts have been made in various ways to extend the activity, for example, in the case of ACTH, by forming complexes of the peptides with inorganic substances such as sparingly soluble zinc compounds, for example zinc hydroxide or zinc phosphate, or with organic substances such as gelatine, polyvinylpyrrolidone, carboxymethylcellulose, phosphoric acid esters of polyphenols or polyalcohols, for example polyphloretin phosphate or alkaline or acid polyaminoacids, for example protamine or polyglutamic acids. Apart from the fact that the desired prolongation of the effect is not entirely satisfactory, certain of the preparations manufactured also show the disadvantage that they can cause allergies.

It has now been found that a substantially greater prolongation of the action than hitherto can be achieved if the peptide is used in the form of oily suspensions or oily gels which contain an aluminium salt of a fatty acid as the adsorbent or as the gel-forming agent. Hence the subject of the present invention are pharmaceutical preparations in the form of oily suspensions or oily gels which contain an effective dose of a physiologically active peptide and an aluminium salt of a fatty acid, and process for the manufacture and use of such preparations.

The new preparations, for example ACTH preparations or calcitonin preparations show a prolongation of the action by several days, for example 7–8 days. This was in no way forseeable from the state of the art. Above all it is also surprising that this long action can be achieved with the customary extremely small doses of peptide, for example with fractions of a milligram.

According to experience, low doses of peptides in oily suspensions, which are suitable for intramuscular or subcutaneous administration, can no longer be withdrawn at the correct dosage after they have been stored for some time, since it is no longer possible to produce a homogeneous suspension by shaking. On the other hand, in the oily suspensions or gels according to the invention even very small amounts of peptide can easily be uniformly finely distributed by shaking before use.

The new preparations can not only be used intramuscularly or subcutaneously but also nasally.

As already mentioned, the essential characteristic of the new oily peptide suspensions or peptide gels is that they contain a fatty acid salt of aluminium, for example aluminium stearate. In the former case, the preparations are suspensions of an adsorbate of the peptide on a fatty acid salt of aluminium, in an oil; in the latter case, the preparations are suspensions of the peptide in a gel which consists of a fatty acid salt of aluminium and an oil.

The adsorbate of the peptide on the fatty acid salt of aluminium can be manufactured in various ways. Thus it is possible to dissolve or suspend the peptide in an aqueous or organic solvent, such as water, alcohols or acetone, preferably a solvent which can easily be removed by evaporation, for example a lower alkanol such as ethanol or isopropanol, especially methanol, to add the fatty acid salt of aluminium and to remove the solvent from the suspension thus obtained, for example by evaporation in vacuo.

It is however also possible to dissolve the fatty acid salt of aluminium colloidally in an organic solvent, for example unsubstituted or chlorinated hydrocarbons such as benzene, chloroform, methylene chloride or ethylene chloride, suspend the peptide in this colloidal solution and then remove the solvent by lyophilisation or evaporation. If lyophilisation is used, a structured adsorbate is obtained.

The ratio of the amount of peptide to fatty acid salt of aluminium as the adsorbent is in particular 1:2 to 1:20, preferably 1:5 to 1:10. Thus, for example, 0.1 to 0.3 mg of peptide can be adsorbed on 1 mg of aluminium stearate, 0.5 mg of peptide on 3 mg, or 1 mg of peptide on 5 mg. of aluminium stearate. The examples given correspond to a single dose of the preparation per ml of oil, for example in the case of $\beta$-corticotropin or analogous ACTH-peptides.

The gel manufactured using a fatty acid salt of aluminium consists of a mixture of approx. 0.1 to 5%, preferably 0.5 to 2% (weight:volume) of fatty acid salt of aluminium, and an oil. The gel can be manufactured in a known manner, for example by heating the oil, together with the fatty acid salt of aluminium, slowly to approx. 115°–140°C. whilst stirring. Hereupon a gel forms. This is cooled to room temperature. The gel for example has a viscosity of 50–100 cP (measured at 25°C by means of a Ferranti instrument, at a rate of shear of 20,000 sec$^{-1}$). Sterile gels are preferably manufactured by sterilisation at 150°C (1–3 hours in an oil bath). It is also possible to add preservatives to the gel, for example benzyl alcohol or, preferably, tert.-chlorobutanol or phenol. The preservative can, for example, be added to the gel at 40°C whilst stirring gently and the mixture can subsequently be cooled to room temperature.

The fatty acid salt of aluminium to be used as adsorbent or gel-forming agent in the preparations contains, above all, stearic acid as the fatty acid, but it is also possible to use other long-chain saturated or unsaturated fatty acids with 12 to 22 carbon atoms, for example lauric acid, tridecylic acid, myristic acid, pentadecylic acid, palmitic acid, margaric acid, stearic acid, nonadecylic acid, arachidic acid, eicosa-1-carboxylic acid, behenic acid and corresponding unsaturated acids such as, for example, oleic acid, elaidic acid, erucic acid, brasidic acid and linoleic acid. The fatty acid salt of aluminium can be a mono-, di- or tri-fatty acid salt and is preferably a di-fatty acid salt. The commercially available products of which the aluminium and/or fatty acid content in general does not correspond precisely to the chemical designation can be used. For example, aluminium monostearate according to U.S. Pharmacopeia XVIII gives 14.5 to 16.0% of $Al_2O_3$ as the residue after ignition; the theoretical amount is 14.7%. Preferably, a fatty acid salt of aluminium of which the aluminium content corresponds to 9–10% (% by weight) of $Al_2O_3$ is used.

The oil used for the manufacture of the gel or of the oily suspension is a liquid fatty acid ester which contains, as the acid component, a long-chain fatty acid with 8–22, especially 12–22, carbon atoms, such as, for example, the abovementioned fatty acids. The alcohol component has a maximum of 6 carbon atoms and is a monohydric or polyhydric, for example monohydric, dihydric or trihydric, alcohol, for example methanol, ethanol, propanol, butanol or pentanol or their isomers, but above all glycol or glycerine. Hence, examples of fatty acid esters to be mentioned are: ethyl oleate, isopropyl myristate, isopropyl palmitate, "Labrafil M 2735" (polyoxyethylene-glycerine trioleate of Messrs. Gattefosse, Paris), "Miglyol 812" (triglyceride of saturated fatty acids of chain length $C_8$ to $C_{12}$, of Messrs. Chemische Werke Witten/Ruhr, Germany), but especially vegetable oils such as cottonseed oil, almond oil, olive oil, castor oil, sesame oil, soya bean oil, and, above all, groundnut oil.

Possible physiologically active peptides which can be used according to the invention in the form of oily suspensions or gels are the initially mentioned peptides, above all calcitonins and peptides having MSH or ACTH action. By peptides there are to be understood both free peptides and derivatives, above all amides, and also N-acyl derivatives or $N^\alpha$-desamino compounds of the free peptides.

The ACTH and MSH peptides include the peptides having the structure of the natural MSH and ACTH peptides and synthetic peptides having an aminoacid sequence which is shorter and/or modified with regard to individual aminoacids. As ACTH-active peptides or peptide-amides there are to be mentioned, for example, those having a N-terminal sequence of up to aminoacid 17. to 39. of the natural corticotropins. In this sequence, one or more of the aminoacids, above all the aminoacids 1 to 4, can be absent, as shown, for example, in Angew. Chemie 83, 155 (1971), or one or more aminoacids, for example in positions 1–5, 11, 15–18 and 25–33, can be replaced by other aminoacids and aminoacid 1 can also be replaced by a desaminocarboxylic acid. Thus, for example, the serine radicals serine$^1$ and/or serine$^3$ can be replaced by glycine or alanine, tyrosine$^2$ can be replaced by phenylalanine, methionine$^4$ can be replaced by $\alpha$-amino-lower alkyl-acetic acid, with lower alkyl possessing 2–4 carbon atoms, for example norvaline, valine, norleucine, leucine, isoleucine, and $\alpha$-aminobutyric acid, glutamic acid$^5$ can be replaced by glutamine, lysine$^{11}$ and/or lysine$^{15,16}$ can be replaced by ornithine, arginine$^{17, 18}$ can be replaced by lysine or ornithine and aminoacid$^{25}$ can be replaced by valine. Serine$^1$ can also be replaced, for example, by proline, $\alpha$- or $\beta$-alanine, threonine, propionic acid, $\beta$-aminopropionic acid, $\beta$-hydroxy-propionic acid, butyric acid, $\gamma$-aminobutyric acid, $\alpha$-aminoisobutyric acid, valeric acid, caproic acid, $\epsilon$-aminocaproic acid or phenylglycine. All aminoacids, apart from those in the N-terminal 1-position necessarily have the L-configuration. Preferably, the new preparations contain ACTH-active peptides of which the first aminoacid has the D-configuration, above all D-serine; furthermore, peptides having a chain length of 18–24 aminoacids, above all 18–19 aminoacids, are preferably used. Further preparations to be singled out are those which contain C-terminal N-unsubstituted amides of the ACTH-active peptides mentioned, above all those of peptides with a sequence of 18 aminoacids, especially D-Ser$^1$-Lys$^{17,18}$-$\beta^{1-18}$-corticotropin-Lys$^{18}$-amide. Peptides with 25–39 aminoacids preferably have, in the 25–33 section, the sequence found for human ACTH (compare Nature New Biology 235, 114 [1927]).

Further examples of ACTH-active peptides which are suitable for the preparations are D-Ser$^1$-corticotropin-Arg$^{18}$-amide, D-Ser$^1$-Orn$^{11}$-Lys$^{17, 18}$-$\beta^{1-18}$-corticotropin-Lys$^{18}$-amide, D-Ser$^1$-Orn$^{11,15-18}$-$\beta^{1-18}$-corticotropin-Orn$^{18}$-amide, $\alpha$-aminoisobutyryl$^1$-$\beta^{1-18}$-corticotropin-Arg$^{18}$-amide, D-Ser$^1$-Orn$^{17,18}$-$\beta^{1-18}$-corticotropin-Orn$^{18}$-amide, D-Ser$^1$-Gly$^3$-Lys$^{17,18}$-$\beta^{1-18}$-corticotropin-Lys$^{18}$-amide, D-Ser$^1$-Nle$^4$-Lys$^{17,18}$-$\beta^{1-18}$-corticotropin-Lys$^{18}$-amide, D-Ser$^1$-Lys$^{17,18}$-$\beta^{1-19}$-corticotropin, $\beta^{1-19}$-corticotropin, D-Ser$^1$-$\beta^{1-19}$-corticotropin, $\beta^{1-19}$-corticotropin-Pro$^{19}$-amide, Glu(NH$_2$)$^5$-$\beta^{1-19}$-corticotropin, D-Ser$^1$-Lys$^{17,18}$-Val$^{19}$-$\beta^{1-19}$-corticotropin-Val$^{19}$-amide, D-Ser$^1$-Nle$^4$-Lys$^{17,18}$-Val$^{19}$-$\beta^{1-19}$-corticotropin-Val$^{19}$-amide, $\beta^{1-20}$-corticotropin-Val$^{20}$-amide, D-Ser$^1$-$\beta^{1-20}$-corticotropin-Val$^{20}$-amide, D-Ser$^1$-Lys$^{17,18}$-$\beta^{1-20}$-corticotropin-Val$^{20}$-amide, $\beta$-aminobutyryl$^4$-Glu(NH$_2$)$^5$-$\beta^{1-20}$-cotricotropin-Val$^{20}$-amide, D-Ser$^1$-Lys$^{17,18}$-$\beta^{1-19}$-corticotropin-Pro$^{19}$-amide, $\alpha$-aminobutyryl$^4$-$\beta^{1-20}$-corticotropin-Val$^{20}$-amide, $\beta^{1-21}$-corticotropin, D-Ser$^1$-Lys$^{17,18}$-$\beta^{1-21}$-corticotropin-Lys$^{21}$-amide, D-Ser$^1$-Lys$^{17,18}$-$\beta^{1-22}$-corticotropin-Val$^{22}$-amide, $\beta^{1-23}$-corticotropin, $\beta^{1-23}$-corticotropin-Tyr$^{23}$-amide, $\beta$-Ala$^1$-$\beta^{1-23}$-corticotropin-Tyr$^{23}$-amide, D-Ser$^1$-$\beta^{1-23}$-corticotropin-Tyr$^{23}$-amide, D-Ser$^1$-Ala$^3$-$\beta^{1-23}$-corticotropin-Tyr$^{23}$-amide, Gly$^1$-$\beta^{1-23}$-corticotropin-Tyr$^{23}$-amide, D-Ser$^1$-Lys$^{17,18}$-$\beta^{1-23}$-corticotropin-Tyr$^{23}$-amide, $\beta^{1-24}$-corticotropin, Glu(NH$_2$)$^5$-$\beta^{1-24}$-corticotropin, D-Ser$^1$-Orn$^{17,18}$-$\beta^{1-24}$-corticotropin, Gly$^{1,3}$-$\beta^{1-24}$-corticotropin, Orn$^{17,18}$-$\beta^{1-24}$-corticotropin, Lys$^{17,18}$-$\beta^{1-24}$-corticotropin, D-Ser$^1$-Nle$^4$-$\beta^{1-24}$-corticotropin, D-Ser$^1$-$\beta^{1-24}$-corticotropin, D-Ala$^1$-$\beta^{1-24}$-corticotropin, D-Ser$^1$-Gly$^3$-Lys$^{17,18}$-$\beta^{1-24}$-corticotropin, D-Ser$^1$-Nle$^4$-Lys$^{17,18}$-$\beta^{1-24}$-corticotropin-Pro$^{24}$-amide, D-Ser$^1$-Orn$^{17,18}$-$\beta^{1-24}$-corticotropin-Pro$^{24}$-amide, D-Ser$^1$-Nle$^4$-Orn$^{17,18}$-$\beta^{1-24}$-corticotropin-Pro$^{24}$-amide, D-Ser$^1$-Gly$^3$-Lys$^{17,18}$-$\beta^{1-24}$-corticotropin-Pro$^{24}$-amide, D-Ser$^1$-Lys$^{17,18}$-$\beta^{1-24}$-corticotropin, D-Ser$^1$-Lys$^{17,18}$-$\beta^{1-24}$-corticotropin-Pro$^{24}$-amide, D-Ser$^1$-Nle$^4$-Val$^{25}$-$\beta^{1-25}$-corticotropin-Val$^{25}$-amide, D-Ser$^1$-Nle$^4$-D-Val$^{25}$-$\beta^{1-25}$-corticotropin-D-Val$^{25}$-amide, D-Ser$^1$-Nva$^4$-Lys$^{17,18}$-Val$^{25}$-$\beta^{1-25}$-corticotropin-Val$^{25}$-amide, $\beta^{1-25}$-corticotropin-Val$^{25}$-amide, D-Ser$^1$-Nle$^4$-Lys$^{17,18}$-Val$^{25}$-$\beta^{1-25}$-corticotropin-Val$^{25}$-amide, Nle$^4$-Val$^{25}$-$\beta^{1-25}$-corticotropin-Val$^{25}$-amide, Nva$^4$-Val$^{25}$-$\beta^{1-25}$-corticotropin-Val$^{25}$-amide, Nle$^4$-Lys$^{17,18}$-Val$^{25}$-$\beta^{1-25}$-corticotropin-Val$^{25}$-amide, $\beta^{1-26}$-corticotropin, $\beta^{1-28}$-corticotropin, $\beta^{1-30}$-corticotropin, $\beta^{1-31}$-corticotropin, $\beta^{1-39}$-corticotropin, D-Ser$^1$-$\beta^{1-39}$-corticotropin and Gly$^1$-$\beta^{1-39}$-corticotropin.

Synthetic $\alpha$-MSH peptides which, as described in Belgian Pat. No. 776,102 (Case 4-7276/1+2), have a regulating action on the secretion of the growth hormone and which can also be used in the new preparations are the peptides mentioned in the above application, especially those having the sequence of the first 11–16 aminoacids of ACTH, wherein the replacement aminoacids mentioned above for ACTH can be present, and wherein the first aminoacid is preferably acylated, especially acetylated, above all $\alpha$-MSH and D-Ser$^1$-$\alpha$-MSH.

Calcitonins to be used in the preparations are the known natural calcitonins such as pig calcitonin, human calcitonin, salmon calcitonin, cattle calcitonin, sheep calcitonin and synthetic analogues in which one or more aminoacids are replaced by others, for example methionine by norleucine, or in which the first aminoacid is replaced by a desaminoacid or an acylaminoacid.

In the preparations, the peptide is used in the free form or in the form of a therapeutically usable acid addition salt. Such salts are derived, for example, from inorganic acids, such as hydrogen halide acids, for example hydrochloric acid or hydrobromic acid, perchloric acid, nitric acid or thiocyanic acid, sulphuric acid or phosphoric acid, or from organic acids, such as formic acid, acetic acid, propionic acid, glycollic acid, lactic acid, pyruvic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicyclic acid, Pamoa acid, 4-aminosalicylic acid, 2-phenoxybenzoic acid, 2-acetoxybenzoic acid, methanesulphonic acid, ethanesulphonic acid, hydroxyethanesulphonic acid, benzenesulphonic acid, p-toluenesulphonic acid, naphthalenesulphonic acid or sulphanilic acid. Salts with long-chain fatty acids, for example those with 12–22 carbon atoms, like those mentioned above, are particularly advantageous. Because of the close relationships between peptides and their acid addition salts, peptides are to be understood in this application as also including their salts, unless otherwise stated.

The preparations according to the invention are manufactured by mixing, in the usual manner, the peptide with the gel, or the adsorbate, consisting of peptide and fatty acid salt of aluminium, with the oil. For example, the peptide or peptide adsorbate is finely ground and optionally first mixed with a small amount of the oil or gel; the remaining oil or gel is then added. A preservative, such as phenol, tert.chlorobutanol or benzyl alcohol, can be added in the usual manner. Peptides which are soluble in preservatives, for example benzyl alcohol, can be mixed in the form of such a solution with the gel.

The injection preparations are manufactured under anti-microbial conditions. Here, a possible procedure is to subject the active compounds and auxiliaries to a suitable anti-microbial treatment before filling them into ampoules or phials. The filling of the containers with the germ-free oily preparations, and the closing of the containers, is also carried out under anti-microbial conditions.

The active dose of the peptide to be used in the preparations is equal to the individual dose which is administered when using the peptide in aqueous suspension or solution. This dose, which depends on the nature of the peptide, is known. In the case of ACTH peptides, for example, it is about 0.1 to 3.0 mg. Ampoules normally contain one individual dose per ml of gel or oil; phials can also contain two or more individual doses.

Because of their longer action, the preparations are administered less frequently, for example 2–5 times less frequently, than the previous depot preparations, for example zinc phosphate complexes.

The examples which follow serve to illustrate the invention. The aluminium distearate mentioned in the examples is the product "Manox" of Messrs. Hardman and Holden, Manchester, England.

EXAMPLE 1

2.0 ml of an aluminium distearate-groundnut oil gel are warmed to approx. 30°–40°C and mixed with the amount, corresponding to 6 mg of free peptide, of very finely ground (particle size less than $20\mu$) D-Ser$^1$-Lys$^{17,18}$-$\beta^{1-18}$-corticotropin-Lys$^{18}$-amide hexaacetate. This mixture is diluted to 20.0 ml by stirring with further gel at room temperature and is filled under anti-microbial conditions, into 1 ml ampoules, so that the ampoules contain 0.3 mg of peptide. This individual dose is administered, for example, once to twice weekly.

The gel can be manufactured as follows: 2.0 g of powdered aluminium distearate are added to 100 ml of groundnut oil. This suspension is well mixed and, whilst stirring and warming slowly (2°–3°C per minute), is heated to 140°C (at approx. 115°C–125°C a clear gel forms). The heating is then switched off and stirring is continued until the temperature has fallen to 120°C. From this temperature onwards, the gel can be cooled to room temperature without stirring.

EXAMPLE 2

2.0 ml of an aluminium distearate-groundnut oil gel are warmed to approx. 30°–40°C and mixed with the amount of D-Ser$^1$-Lys$^{17,18}$-$\beta^{1-18}$-corticotropin-Lys$^{18}$-amide hexastearate corresponding to 6 mg of free peptide. The mixture is diluted to 20.0 ml by adding further gel, whilst stirring, so that 0.3 mg of peptide is present per ml of gel. When filled into ampoules under anti-microbial conditions, the preparation can be administered, for example, once to twice weekly.

The gel can be manufactured as described in Example 1. The hexastearate can be manufactured as follows:

200 mg of D-Ser$^1$-Lys$^{17,18}$-$\beta^{1-18}$-corticotropin-Lys$^{18}$-amide hexaacetate hydrate are dissolved in 24 ml of ethanol and 1.6 ml of water and thereafter a solution of 125 mg of stearic acid in 13 ml of ethanol is added. The mixture is evaporated to dryness, the residue is dried over sodium hydroxide and then dissolved in 25 ml of tert.butanol and 5 ml of water whilst warming, the solution is filtered and the filtrate is lyophilised. It is then again dried over sodium hydroxide. 310 mg of D-Ser$^1$-Lys$^{17,18}$-$\beta^{1-18}$-corticotropin-Lys$^{18}$-amide hexastearate are obtained as a light powder of which the solubility in water is less than 0.1%.

EXAMPLE 3

2.0 ml of an aluminium distearate-groundnut oil gel are warmed to approx. 30°–40°C and mixed with the amount, corresponding to 20 mg of free peptide, of very finely ground (particle size less than $20\mu$) D-Ser$^1$-Lys$^{17,18}$-$\beta^{1-18}$-corticotropin-Lys$^{18}$-amide hexastearate. The mixture is diluted to 20.0 ml by adding further gel, containing 100 mg of phenol, whilst stirring, so that 1 mg of peptide is present per gel.

The gel can be manufactured as described in Example 1.

EXAMPLE 4

2.0 ml of an aluminium monostearate-Miglyol gel are warmed to approx. 30°–40°C and mixed with the amount, corresponding to 10 mg of free peptide, of very finely ground (particle size less than $20\mu$) D-Ser$^1$-Lys$^{17,18}$-$\beta^{1-18}$-corticotropin-Lys$^{18}$-amide hexaacetate. The mixture is diluted to 20.0 ml with further gel, whilst stirring, so that 0.5 mg of peptide is present per ml of gel.

The gel can be manufactured as follows: 3.5 g of powdered aluminium monostearate are added to 100 ml of Miglyol 812. This suspension is well mixed and, whilst stirring and slowly warming (2°–3°C per minute), is heated to approx. 140°C (at approx. 115°C–125°C a clear gel forms). The heating is then switched off and the mixture is cooled to 120°C whilst stirring. From this temperature onwards, the gel can be cooled to room temperature without stirring. Viscosity: 42.5 cp.

EXAMPLE 5

2.0 ml of an aluminium distearate-groundnut oil gel are warmed to approx. 30°–40°C and mixed with the amount, corresponding to 20 mg of free peptide, of very finely ground (particle size less than $20\mu$) Synacthen ($\beta^{1-24}$-corticotropin hexaacetate). The mixture is diluted, whilst stirring, to 20.0 ml with further gel to which 100 mg of phenol are added, so that 1.0 mg of peptide is present per ml of gel.

EXAMPLE 6

2.0 ml of an aluminium distearate-groundnut oil gel which has been manufactured with 2% of aluminium distearate are warmed to 30°–40°C and mixed with the amount, corresponding to 2 mg of free peptide, of very finely ground D-Ser$^1$-Lys$^{17,18}$-$\beta^{1-18}$-corticotropin-Lys$^{18}$-amide hexastearate (particle size less than $20\mu$). This mixture is diluted, whilst stirring, to 20.0 ml with further gel which contains 100 mg of phenol, so that 0.1 mg of peptide is present per ml of gel.

EXAMPLE 7

5 ml of an aluminium distearate-groundnut oil gel which contains 0.5% (weight:volume) of aluminium distearate, are warmed to approx. 30°–40°C and mixed with the amount, corresponding to 15 mg of free peptide, of $\beta^{1-24}$-corticotropin hexastearate. The mixture is made up to 50 ml, whilst stirring, with further gel which contains 100 mg of phenol. The suspension is filled into 50 ampoules each of 1 ml capacity. Each ampoule contains 0.3 mg of peptide.

EXAMPLE 8

An amount of D-Ser$^1$-Lys$^{17,18}$-$\beta^{1-18}$-corticotropin-Lys$^{18}$-amide hexastearate, corresponding to 50 mg of free peptide is dissolved in 25 ml of methanol. 250 mg of aluminium distearate which have beforehand been digested several times with methanol are suspended in the solution. The methanol is then distilled off in vacuo at 45°C. The residue is dried in vacuo at 30°–40°C. The very fine adsorbate is suspended in 50 ml of groundnut oil in which 250 mg of phenol have been dissolved beforehand. The suspension is filled into ampoules of 1 ml capacity under anti-microbial conditions. The ampoules each contain 1 mg of peptide.

EXAMPLE 9

250 mg of aluminium distearate in 25 ml of benzene are heated to 50°–60°C until a clear colloidal solution has been produced. The amount, corresponding to 50 mg of free peptide, of D-Ser$^1$-Lys$^{17,18}$-$\beta^{1-18}$-corticotropin-Lys$^{18}$-amide hexastearate is suspended therein. The suspension is frozen at −70°C and lyophilised at −10 to −20°C. The lyophilised adsorbate, which has a characteristic structure, is finely ground and suspended in 50 ml of groundnut oil to which 250 mg of phenol are added. The suspension is filled under anti-microbial conditions into ampoules of 1 ml capacity. These contain 1 mg of peptide.

EXAMPLE 10

Preparations which contain D-Ser$^1$-Gly$^3$-Lys$^{17,18}$-$\beta^{1-18}$-corticotropin-Lys$^{18}$-amide or D-Ser$^1$-Lys$^{17,18}$-$\beta^{1-19}$-corticotropin as the peptide are prepared as described in Examples 1 to 9.

What we claim is:

1. Process for the manufacture of injectable oily ACTH-active peptide preparations which contain an effective dose of an ACTH-active peptide or of its therapeutically usable salts, characterized in that said peptide or peptide salt, as an adsorbate on an aluminum salt of a saturated or unsaturated fatty acid, having 12–22 carbon atoms is suspended in oil, or said peptide or peptide salt is suspended in an oily gel which contains an aluminum salt of a saturated or unsaturated fatty acid having 12–22 carbon atoms as the gel-forming agent.

2. Process according to claim 1, characterised in that a gel which contains the aluminium salt of one or more saturated or unsaturated fatty acids with 12–22 carbon atoms is used in the preparations.

3. Process according to claim 1, characterised in that a gel which contains 0.5–2% (weight:volume) of aluminium salt is used in the preparations.

4. Process according to claim 1, characterised in that a gel which contains a fatty acid ester which is derived from a saturated or unsaturated fatty acid with 8–22 carbon atoms is used in the preparations.

5. Process according to claim 1, characterised in that a gel which contains groundnut oil as the fatty acid ester is used in the preparations.

6. Process according to claim 1, characterised in that an adsorbate of the peptide or peptide salt on a aluminium salt of one or more saturated or unsaturated fatty acids with 12–22 carbon atoms is used in the preparations.

7. Process according to claim 1, characterised in that an adsorbate of the peptide or peptide salt on an aluminium stearate is used in the preparations.

8. Process according to claim 1, characterised in that an adsorbate of the peptide or peptide salt on an aluminium distearate is used in the preparations.

9. Injectable oily peptide preparations wherein an ACTH-active peptide or of its therapeutically usable salts in either adsorbed on an aluminium salt of a fatty acid having 12–22 carbon atoms and the adsorbate is suspended in oil, or said peptide or said peptide salt is suspended in a gel of an aluminum salt of a saturated or unsaturated fatty acid having 12–22 carbon atoms and an oil.

10. Preparations according to claim 9 which contain therapeutically usable salts of ACTH-active peptides having a sequence of 17–39 aminoacids wherein optionally one or more of the aminoacids 1–5, 11, 15–18 and 25–33 of the natural sequence are replaced by other aminoacids.

11. Peptide preparations according to claim 9 which contain acid addition salts of the peptides mentioned with long-chain saturated or unsaturated fatty acids.

12. Peptide preparations according to claim 9, which contain the aluminium salt of one of more saturated or unsaturated fatty acids with 12–22 carbon atoms.

13. Peptide preparations according to claim 9, which contain an aluminium distearate.

14. Peptide preparations according to claim 9, which contain a fatty acid ester, which is derived from a saturated or unsaturated fatty acid with 8–22 carbon atoms, as the oil.

15. Peptide preparations according to claim 9, which contain groundnut oil as the oil.

16. Excipient for peptides, characterised in that it consists of a gel containing a mixture of approx. 0.5 to 2% (weight:volume) of an aluminium salt of a fatty acid and an oily fatty acid ester.

17. The therapeutic use of ACTH-active peptides in the form of oily suspensions wherein the peptide or peptide salt is eith adsorbed on an aluminium salt of a saturated or unsaturated fatty acid having 12–22 carbon atoms and the adsorbate is suspended in oil, or the peptide or peptide salt is suspended in a gel of an aluminum salt of a fatty acid having 12–22 carbon atoms and an oil.

* * * * *